United States Patent
Banthia et al.

(10) Patent No.: US 8,504,408 B2
(45) Date of Patent: Aug. 6, 2013

(54) CUSTOMER ANALYTICS SOLUTION FOR ENTERPRISES

(75) Inventors: Manisha Banthia, Bangalore (IN); Madana Mohana Babu, Anantapur (IN); Sharmistha Sikdar, Faridabad (IN)

(73) Assignee: Infosys Limited (IN)

( * ) Notice: Subject to any disclaimer, the term of this patent is extended or adjusted under 35 U.S.C. 154(b) by 152 days.

(21) Appl. No.: 12/816,448

(22) Filed: Jun. 16, 2010

(65) Prior Publication Data

US 2011/0251874 A1 Oct. 13, 2011

(30) Foreign Application Priority Data

Apr. 13, 2010 (IN) .............................. 1029/CHE/2010

(51) Int. Cl.
*G06Q 10/00* (2012.01)

(52) U.S. Cl.
USPC ........................................................ 705/7.29

(58) Field of Classification Search
USPC ........................................................ 705/7.29
See application file for complete search history.

(56) References Cited

U.S. PATENT DOCUMENTS

| | | | | |
|---|---|---|---|---|
| 6,901,406 | B2 * | 5/2005 | Nabe et al. | 707/694 |
| 7,003,476 | B1 * | 2/2006 | Samra et al. | 705/7.28 |
| 7,092,920 | B2 * | 8/2006 | Heard | 706/12 |
| 7,707,059 | B2 * | 4/2010 | Reed et al. | 705/7.31 |
| 7,725,300 | B2 * | 5/2010 | Pinto et al. | 703/2 |
| 2002/0099594 | A1 * | 7/2002 | Heard | 705/10 |
| 2011/0231246 | A1 * | 9/2011 | Bhatia et al. | 705/14.43 |

* cited by examiner

*Primary Examiner* — Johnna Loftis
(74) *Attorney, Agent, or Firm* — Lerner, David, Littenberg, Krumholz & Mentlik, LLP

(57) ABSTRACT

A method for building an integrated customer analytics solution for an enterprise is provided. The method enables retrieving and processing customer data from data sources available in the enterprise. Further, statistical techniques are generated using the processed data to facilitate analyzing attributes related to the customer. Statistical model outputs are, then, derived using the generated statistical techniques. The statistical model outputs represent metrics corresponding to the analyzed attributes. Furthermore, statistical models are generated corresponding to the statistical model outputs. The statistical models are associated with scores that facilitate to predict likelihood of customer behavior towards products, services and other customer related aspects associated with the enterprise. In addition, reports are generated based on at least one of: the processed data and the one or more statistical model outputs. Finally, the method enables building analytical modules comprising the reports and the statistical models.

14 Claims, 5 Drawing Sheets

CUSTOMER ANALYTICS SOLUTION FOR ENTERPRISES

BACKGROUND OF THE INVENTION

The present invention relates generally to management, analysis and reporting of data across various data sources and more specifically to a system and method for providing customer analytics solution integrated with statistical models and business reports to an enterprise for efficient management of customers.

With advancements in technology and increase in diversity and complexities of enterprises, Customer Relationship Management (CRM) has become a vital tool for gaining both operational and financial advantage in any enterprise. CRM generally involves various aspects of interaction between an enterprise and its customers relating to sales and/or services. Complete understanding of customer need is one of the important aspects of effective CRM implementations. Acquisition of data related to customers and analyzing customer behavior is an important factor for understanding customer needs. Further, efficient analysis leads to development and retention of customers which in turn facilitates improving business of any enterprise.

Conventionally, various enterprises adopt business intelligence tools, as part of CRM, for analyzing customer relationships with enterprises. Business intelligence tools refer to software tools employed for improving business decisions related to any enterprise. For example, various customer analytics tools exist for analyzing specific data related to customers. Further, various report generation tools exist for generating reports related to specific customer data. Typically, an enterprise need to partner with third party providers of customer analytics tool or report generation tools for obtaining analytics information related to customers. Alternately, enterprises employing customer analytics tools need to integrate with third party providers of report generation tools for obtaining reports related to customers. However, a comprehensive system that provides an effective end-to-end customer analytics solution to enterprises involving customer analytics and business reporting does not exist.

In light of the abovementioned disadvantages, there is a need for a system and method that provides an enhanced customer analytics technique to enterprises which facilitates understanding customer needs effectively to improve services and in turn sales. In addition, there is a need for a system and method that provides customer analytics to enterprises compounded with business reports related to customer data from multiple sources. Further, there is a need for a system and method that provides a unified integrated customer analytics solution which is delivered via a single platform. Furthermore, there is a need for a system and method which enables improving decision making capabilities of an enterprise independently. Also, there is a need for a system and method that facilitates automated generation of complete analytical outputs related to customers.

BRIEF SUMMARY OF THE INVENTION

A method for building an integrated customer analytics solution for an enterprise comprising one or more data sources is provided. The method comprises firstly, retrieving and processing data from the one or more data sources. The data represents customer data. Secondly, the method comprises generating one or more statistical techniques using the processed data to facilitate analyzing one or more attributes related to the customer. The method further comprises deriving one or more statistical model outputs using the one or more generated statistical techniques. The statistical model outputs represent one or more metrics corresponding to the analyzed attributes. Furthermore, the method comprises generating one or more statistical models corresponding to the one or more statistical model outputs. The one or more statistical models are associated with one or more scores that facilitate to predict likelihood of customer behavior towards products, services and other customer related aspects associated with the enterprise. The method further comprises generating one or more reports based on at least one of: the processed data and the one or more statistical model outputs. Finally, the method comprises building one or more analytical modules comprising the one or more reports and the one or more statistical models. The one or more analytical modules constitute the integrated customer analytics solution.

In an embodiment of the present invention, the retrieving and processing the data from the one or more data sources comprises, firstly, gathering the data from the one or more data sources. At least two data sources are disparate data sources. Secondly, the method comprises storing the data in the form of data structures in an operational data store. Further, the method comprises extracting the data if the data structure corresponds to a predetermined data structure and transforming the extracted data based on one or more predetermined formats. Finally, the method comprises loading the transformed data to a data mart.

In another embodiment of the present invention, generating one or more statistical techniques comprises developing one or more codes using a statistical package module and manipulating the processed data using the one or more codes. In an embodiment of the present invention, the one or more generated statistical techniques comprises: descriptive statistics, cluster analysis, forecasting, survival analysis and logit model. In another embodiment of the present invention, the one or more attributes related to the customer comprises: transaction related information, campaign related information, attrition and loyalty related information, customer life time value and survivality related information, profitability related information with respect to products, and customer satisfaction related information with respect to services offered by the enterprise.

In an embodiment of the present invention, the one or more statistical model outputs comprises: recency frequency monetary computation, cross-sell model output, customer lifetime value (CLV) model output, campaign response model output, and attrition model output. In another embodiment of the present invention, the one or more metrics comprises: recency, frequency and monetary value of transactions made by the customer, value representing one or more campaign management and performance related details, value representing attrition, customer lifetime value, value representing product related details, and value representing service related details offered by the enterprise. In an embodiment of the present invention, the one or more scores comprise recency frequency and monetary score, campaign response score, attrition score, cross-sell products, customer lifetime value, service level agreement score.

In an embodiment of the present invention, generating the one or more reports based on the processed data and the one or more statistical model outputs comprises writing queries to the data mart employing a reporting module and obtaining the one or more reports based on processed data stored in a data mart and the one or more metrics stored in the data mart. In an embodiment of the present invention, the queries are written using at least one of the query languages: multidimensional expressions and standard query language.

In another embodiment of the present invention, the one or more analytical modules comprises: transaction behavior analysis module, campaign performance and management module, attrition and loyalty analysis module, cross-sell and product holding analysis module, customer profitability and lifetime value analysis module and service request analysis module. In an embodiment of the present invention, the queries are written to the data mart at one or more stages to build the one or more analytical modules comprising the one or more reports and the one or more statistical models. In an embodiment of the present invention, the one or more stages comprises: transaction behavior and channel preference stage to build transaction behavior analysis module, lead generation and campaign management and performance stage to build campaign performance and management module, predicting attrition and tracking attrition stage to build attrition and loyalty analysis module, profitability and survival analysis stage to build customer profitability and lifetime value analysis module, product holding and cross-sell product and re-profiling and re-positioning stage to build cross-sell and product holding analysis module, service request analysis and service level agreement analysis to build the service request analysis module.

A system for building an integrated customer analytics solution for an enterprise comprising one or more data sources is provided. The system comprises a data mart configured to store customer data obtained from the one or more data sources. The data from the one or more data sources is stored in the data mart in a predetermined format. The system further comprises a statistical package module configured to generate one or more statistical model outputs based on the data stored in the data mart using one or more statistical techniques. Further, one or more statistical models are generated using the one or more statistical model outputs. The system further comprises a reporting module configured to generate one or more reports based on the data stored in the data mart and the statistical model outputs. Furthermore, one or more analytical modules are generated using the one or more reports and the one or more statistical models resulting in the integrated customer analytics solution.

In an embodiment of the present invention, the two data sources are disparate data sources. In another embodiment of the present invention, the system further comprises a data management module configured to extract the data from an operational data store. The extraction is performed to ascertain that the data structure corresponds to a predetermined data structure. Further, the system transforms the extracted data to a predetermined format and loads the transformed data to a data mart.

In an embodiment of the present invention, the reporting module comprises a Jasper Reporting Tool. In another embodiment of the present invention, the statistical package module comprises R-project. In yet another embodiment of the present invention, the data mart is a multidimensional database or a relational database.

BRIEF DESCRIPTION OF THE DRAWINGS

The present invention is described by way of embodiments illustrated in the accompanying drawings wherein.

DETAILED DESCRIPTION

A system and method that provides a customer analytics solution to enterprises integrated with business reports and statistical models are described herein. The integrated customer analytics solution is provided for CRM in enterprises such as banks and other public organizations across customer lifecycle of acquisition, development and retention. The invention provides a complete customer analytics solution that may be integrated with core enterprise data for accurate customer analysis. Further, the invention facilitates analyzing and predicting customer behavior towards products and services and providing reports based on dynamic customer behavior. For example, the invention facilitates identifying target customers for a campaign, next best product to be cross sold, predicting attrition, understanding life time value of customers, identifying segments for a loyalty program and reposition, offering strategies based on changes in customer profiles etc. Furthermore, the invention facilitates channelizing enterprise resources (products and services) optimally towards customers on the basis of analysis.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
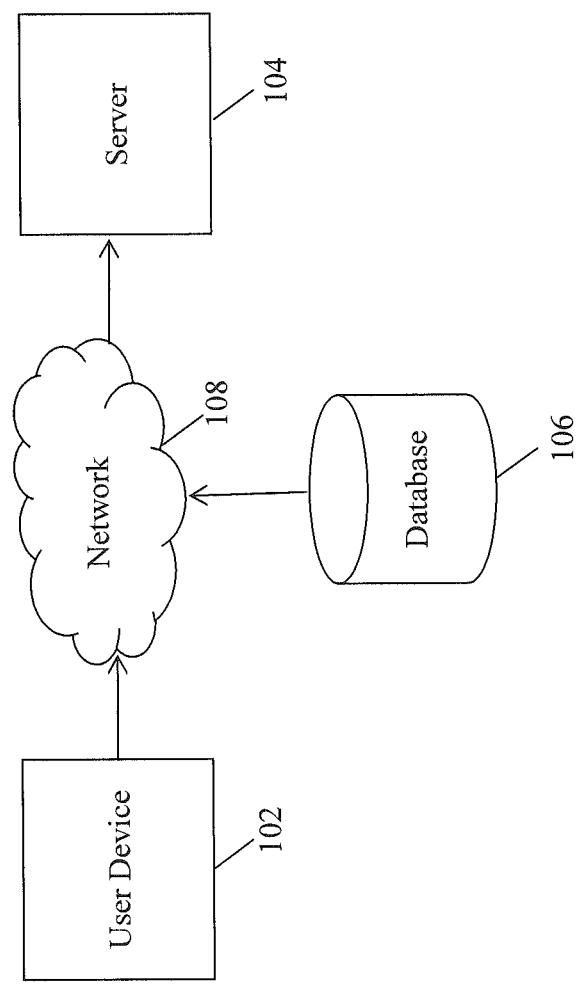
FIG. 1 is a block diagram illustrating components of an exemplary system in which various embodiments of the present invention may be implemented.

FIG. 1 is a block diagram illustrating components of an exemplary system 100 in which various embodiments of the present invention may be implemented. The system 100 comprises one or more user devices 102, one or more servers 104, one or more databases 106 and a network 108.

The one or more user device 102 may include any computing device having a client application such as web browser application or any other dedicated application for accessing a remote service, a database application, one or more applications capable of creating, developing and running application programs, and/or server applications. Examples of the one or more user device 102 may include personal computers, laptop computers having any standard operating system such as Linux, Windows 2000 etc. Further, examples of user device 102 may include cell phones, personal digital assistants, blackberry having various services such as internet, short messaging service (SMS), email etc. The user device 102 may also include electronic devices such as thin client-computer systems, gaming systems or internet enabled computer systems capable of displaying and navigating web pages or any other electronic documents. In various embodiments of the present invention, a reporting tool and a statistical package module is provided on the user device 102. In an embodiment of the present invention, the reporting tool may include a Jasper Reporting Tool. The Jasper Reporting Tool facilitates generating various reports related to analysis of customer behavior towards products, services and other aspects related to the customer's relationship with the enterprise. In another embodiment of the present invention, the statistical package module may include R-Project which is used for obtaining statistical models. The statistical models facilitate to predict likelihood of customer behavior towards products, services and other aspects related to the customer's relationship with the enterprise.

The one or more servers 104 may include any general purpose and/or specialized computers capable of processing requests from the user device 102. The one or more servers 104 may include servers having dedicated applications such as business applications related to an enterprise, web server, application server and/or database servers. Examples of servers 104 may include, but are not limited to, personal computer servers such as Windows Server 2003, Apache Tomcat Server, and IBM Websphere. In an embodiment of the present invention, the IBM Websphere Server may be an embeddable server for building reports related to customers of an enterprise. In an embodiment of the present invention, the IBM Websphere server enables generation of reports based on various inputs such as queries provided by the user employing the Jasper Reporting Tool. The user may be a data analyst, developer or any other person who develops the customer analytics solution. The reports that are generated may be configured on the IBM Websphere Server. In another embodiment of the present invention, the IBM Websphere Server facilitates performing statistical analysis of customer data using the R-Project. Further, the IBM Websphere Server facilitates the user to derive statistical models based on the statistical analysis using the R-Project.

In an embodiment of the present invention, the system 100 may also include one or more databases 106 which may reside locally in one or more user device 102. In another embodiment of the present invention, the one or more databases 106 may remotely communicate with the one or more user device 102. Examples of database may include relational database management systems such as oracle, MySQL or multidimensional database systems etc. In various embodiments of the present invention, the database may be used for generating reports as well as statistical models via Jasper Reporting Tool and R-Project statistical package. In an embodiment of the present invention, a data mart is used as an input data source for the Jasper Reporting Tool and the statistical modeling package.

The one or more user devices 102 communicate with the one or more server computers 104 over the network 108. The network may include, but is not limited to, any data communication network such as local area network (LAN), virtual private network (VPN), wide area network (WAN), internet, intranet, extranet, or any other wireless network such as global system for mobile communication (GSM), code division multiple access (CDMA) etc.

Figure 2:
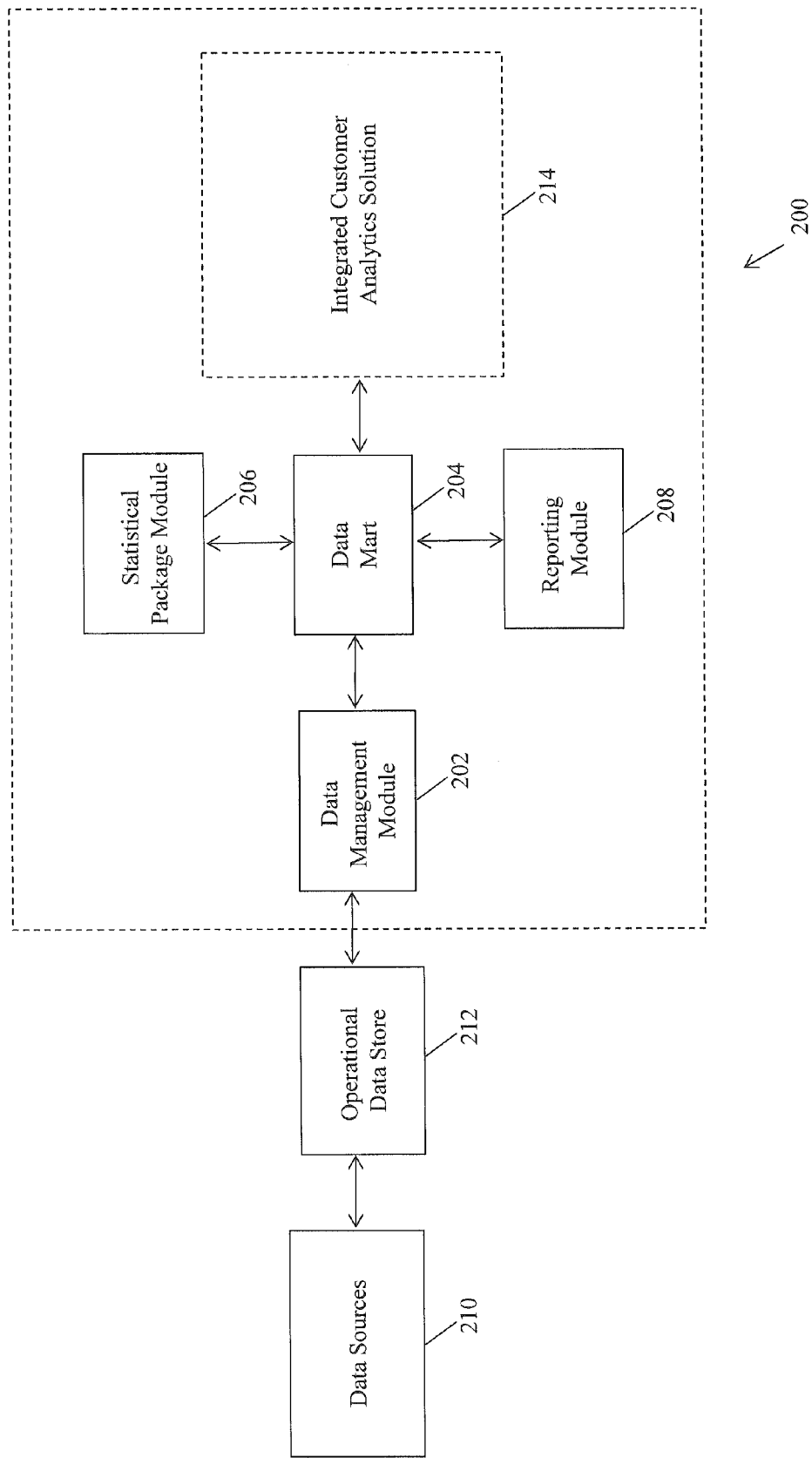
FIG. 2 is a detailed block diagram of a system for building an integrated customer analytics solution for an enterprise, in accordance with an embodiment of the present invention.

FIG. 2 is a block diagram of a system for building an integrated customer analytics solution for an enterprise, in accordance with an embodiment of the present invention.

In various embodiments of the present invention, the system 200 comprises a data management module 202, a data mart 204, a statistical package module 206, and a reporting module 208.

In enterprises such as banks multiple data sources 210 are used to store data related to customers. The multiple data sources 210 may be separate or disparate sources used to store data using different codes or data structures or formats. Data from the multiple data sources 210 may be used to obtain information related to customers. In an exemplary embodiment of the present invention, in case of banks, data from the data sources 210 may comprise core data related to the banks. For example, core data related to banks may comprise customer demographic data, account and product holding data across all product types, transaction data related to customers and other data representing various facts related to the customer. In another exemplary embodiment of the present invention, data from multiple sources 210 may comprise data related to customer relationship management such as campaign and service request data. Further, the data may comprise external data such as prospect data, and data corresponding to external customer databases like credit rating, enquiry data, etc.

Further, the enterprise may comprise an operational data store 212. The operational data store 212 is the enterprise data warehouse that stores detailed data related to the enterprise. In an embodiment of the present invention, the operational data store 212 gathers data from the data sources 210 and stores the data. The operational data store 212 stores the data as data structures in tables within the operational data store 212. For example, operational data store 212 stores customer data such as data related to customer details, customer demographics, product holding data, account transaction data and other data related to the customers.

The data management module 202 is a software module that can extract data from the operational data store 212, transform the extracted data as needed and load the transformed data into the data mart 204. In an embodiment of the present invention, the data management module 202 performs Extract Transform Load (ETL) activities of data stored in tables in the operational data store 212. The ETL may include extracting existing fields from the tables without any changes, transforming the existing fields into new fields and loading the new fields into the data mart 204. For example, if the field is 'book', details such as customer's 'age' is extracted from the field. The 'age' is subtracted from current date and transformed into months. The month data is, then, loaded into the field called 'age on book in months', in the data mart 204. Further example may include creating product holding string like asset/liability/investment in the data mart 204. In an exemplary embodiment of the present invention, IBM data stage V8.1 may be used for the ETL activities.

The data mart 204 is an analytical data mart which comprises a subset of the enterprise's data stored as data structures. In various embodiments of the present invention, the source for data structures stored in the data mart 204 is the operational data store 212. The data mart 204 facilitates developing various analytical modules of the integrated customer analytics solution 214 comprising the business reports and statistical models. In an exemplary embodiment of the present invention, the data mart 204 may be built using known technologies such as dimensional modeling, star schemas and multi-dimensional data modeling etc. In another exemplary embodiment of the present invention, the data mart 204 may be a relational database management system or a multidimensional database system.

The statistical package module 206 is a software module that facilitates generating various statistical model outputs using the data stored in the data mart 204. The statistical model outputs are used for building various statistical models of the integrated customer analytics solution 214. In an exemplary embodiment of the present invention, the statistical package module 206 may include, but is not limited to, R-project. R-Project is an integrated suite of software facilities which provides a software environment for statistical computing of data and corresponding graphical display of the computed data. R-Project runs on various operating systems such as UNIX, Microsoft or Macintosh. R-Project enables the user to perform manipulation of various data stored in the data mart 204 using various codes developed by the user for building various statistical model outputs. For example, R-Project may provide a suite of operators for calculating data on arrays i.e. matrices. Further, R-Project provides a large, coherent, and integrated collection of intermediate tools for data analysis, and graphical facilities for displaying the analyzed data either directly on the user device or on hardcopy. In addition, R-Project provides one or more graphical techniques as well as statistical techniques such as, but not limited to, linear and nonlinear modeling, classical statistical tests, time-series analysis, classification, clustering etc. Further, R-Project provides an effective data handling and storage facility for storing data.

In various embodiments of the present invention, one or more codes may be developed on R-project. Using the codes, data stored in the data mart 204 is manipulated to generate one or more statistical techniques. Examples of statistical techniques may include, but are not limited to, descriptive statistics, cluster analysis, forecasting, survival analysis and logit model. In an embodiment of the present invention, statistical techniques may be developed based on CRM requirements of the enterprise.

In an exemplary embodiment of the present invention, descriptive statistics may be used to determine main features of various fields representing customer related data stored in the data mart 204. For example, descriptive statistics may provide recency, frequency and monetary features related to various transactions carried out by the customer. Descriptive statistics further facilitates meaningful comparison between the various fields. In another exemplary embodiment of the present invention, forecasting techniques may be used to forecast future revenue and cost related to product and service purchases made by the customer or likely to be made by the customer. In yet another exemplary embodiment of the present invention, survival analysis technique may be used for predicting survivability of a customer with the enterprise. In another exemplary embodiment of the present invention, logit model may be used for appropriately predicting outcome of customer behavior such as response to a marketing campaign, attrition etc. In various embodiments of the present invention, the statistical package module 206 generates various statistical model outputs using the above statistical techniques and loads the various statistical model outputs onto the data mart 204.

The reporting module 208 is a software module which facilitates generating reports from the data stored in the data mart 204 and/or the statistical model outputs loaded onto the data mart 204. In an embodiment of the present invention, the reporting module 208 may comprise one or more reporting tools such as Jasper Reporting Tool which may be installed on a user device. Jasper Reporting Tool is a front-end java reporting tool for customers who can write to screen, printer or PDF, HTML, Microsoft Excel, XML files and generates reports via the IBM Websphere Server which may be installed on a server device. In an exemplary embodiment of the present invention, IBM Websphere Server facilitates generating I-Reports. I-Reports are two dimensional reports and can be generated by writing standard query language (SQL) queries to the data mart 204 which may be a relational database system. In another exemplary embodiment of the present invention, IBM Websphere Server facilitates generating Jasper Analysis reports by writing multidimensional expressions to the data mart 204 which may be a multidimensional database. The Jasper Analysis reports provide multidimensional views of the reports.

The reports and statistical models generated constitute one or more analytical modules of the integrated customer analytics solution 214. The integrated customer analytics solution 214 is platform independent and technology agnostic and may be implemented with other industry standard database platforms, data modeling tools, reporting tools and statistical modeling tools. The integrated customer analytics solution 214 may be built using third party tools and infrastructure solutions such as Oracle Database 10G (10.2.0.1.0) on Windows Server 2003, IBM Data Stage 8.0.1 as Extract Transform Load (ETL) tool on Windows Server 2003, Jasper Server Pro 3.1 including Jasper Analysis on Windows Server 2003, Jasper Analysis Workbench, Industry Standard Statistical Tools (SAS/R*), Apache Tomcat 5 as web server. (Apache Tomcat 5 which is generally provided in combination with Jasper Pro 3.1), ERWIN 7.2.5 as data modeling tool, JDK 1.5.0_02 on windows XP for Business Intelligence prompting Framework.

Figure 3:
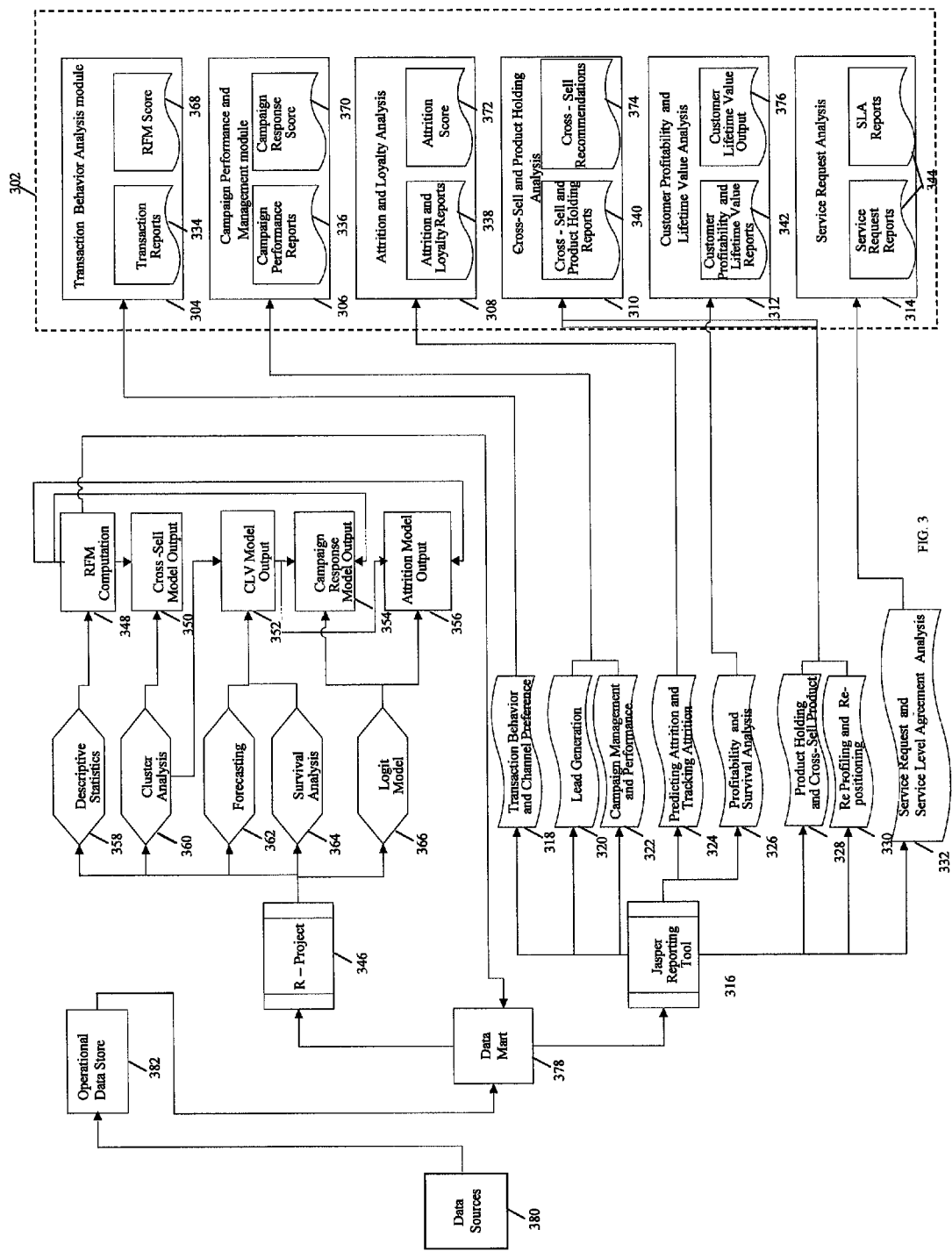
FIG. 3 illustrates a detailed block diagram of an integrated customer analytics solution that is built using the system of FIG. 2, in accordance with an embodiment of the present invention.

FIG. 3 illustrates a detailed block diagram of an integrated customer analytics solution that is built using the system of FIG. 2, in accordance with an embodiment of the present invention.

The integrated customer analytics solution 302 comprises one or more analytical modules such as transaction behavior analysis module 304, campaign performance management module 306, attrition and loyalty analysis module 308, cross-sell and product holding analysis module 310, customer profitability and lifetime value analysis module 312 and a service request analysis module 314.

In various embodiments of the present invention, the above analytical modules of the integrated customer analytics solution 302 are built by writing queries to the data mart 378 using one or more query language at one or more stages of building the analytical modules. In an embodiment of the present invention, the data mart 378 is a multidimensional database and multidimensional expressions (MDX) are written to the database for building the analytical modules comprising reports and statistical models. The reports are generated employing the Jasper Reporting Tool 316. The reports provide information related to the customers of the enterprise. The statistical models are generated using statistical techniques which are computed using the R-Project 346. The statistical models facilitate to determine and describe probability of customer behavior corresponding to products, services and other aspects related to customer relationship with the enterprise, using mathematical equations. In an embodiment of the present invention, each of the statistical models are associated with predictive scoring algorithm. One or more scores are generated using the R-Project 346 based on one or more metrics associated with the customer behavior corresponding to products, services and other aspects related to customer relationship with the enterprise.

In an embodiment of the present invention, MDX may be employed at transaction behavior and channel preference 318 stage to generate transaction behavior analysis module 304. Transaction behavior analysis module 304 comprises transaction reports 334 and recency frequency monetary (RFM) score 368. MDX queries are used for generating the transaction reports 334 from Jasper Reporting Tool 316. The RFM score 368 is an output of RFM computation 348 which is a statistical model output. RFM computation 348 is derived using the statistical technique, descriptive statistics 358. RFM computation 348 describes transactions undertaken by customers. The RFM score 368 describes the level of engagement of the customer with the enterprise. For example, a high RRM score 368 represents a high level of engagement of the customer with the enterprise. In an exemplary embodiment of the present invention, the RFM score 368 is based on a metric i.e. recency, frequency and monetary value of the transactions made by the customer.

The transaction behavior analysis module 304 having transaction reports 334 and RFM score 368, thus, describes various transactions undertaken by customers and facilitates profiling of customers by providing an analysis of the customer's transactional behavior attributes. Such transactional information indicates evolving needs of a customer. Each customer displays distinct behavior in case of monetary transactions. Such behavior is influenced by parameters such as demographics and channel usage of the customers and type of products held by the customers. These parameters can, for example, help in analyzing profiles of customer who are more likely to transact and thus are better targets for cross selling. The transaction behavior analysis module 304 facilitates to track customers who transact more or less over particular channels revealing channel preferences, channel usage for particular products and also transactions of a customer. The transaction behavior analysis module 304 also facilitates to describe delinquency behavior of the customer with respect to their transaction amount and asset value holding.

In another embodiment of the present invention, MDX's may be employed at lead generation 320 and campaign management and performance 322 stage to generate campaign performance management module 306. Campaign performance management module 306 comprises campaign performance reports 336 and campaign response score 370. MDX queries are used for generating the campaign performance reports 336 from Jasper Reporting Tool 316. The campaign response score 370 is an output of the campaign response model output 354 which is a statistical model output. The campaign response model output 354 is obtained by using statistical model outputs such as logit model 366 and RFM computation 348. Campaign response model output 354 provides the campaign response score 370. The campaign response score 370 facilitates predicting probability of a customer responding to a campaign for a given product. In an exemplary embodiment of the present invention, the campaign response score 370 is based on a metric i.e. a value which indicates past campaign performance such as responses to marketing mailers for a product offer.

The campaign performance management module 306 having campaign performance reports 336 and campaign response score 370, thus, describes lead generation, campaign management, campaign performance and response of the customer for a campaign. The lead generation information facilitates finding right customer from an existing customer base or prospect data to cross sell or up sell products. Lead generation also includes finding key factors in customer profiles from previous campaigns. The campaign performance management module 306 facilitates identifying patterns and trends in customers already holding the product for cross sell. These patterns are then matched against the customers not holding the product. This generates a list of customers who have characteristics to purchase and use the product but do not hold the product. The campaign performance management module 306 facilitates the enterprise to organize budget and product on a selective group of customers rather than targeting the entire customer base. The campaign performance information as described by the campaign performance management module 306 provides information associated with customer acquisition.

The campaign performance management module 306 facilitates enterprises to understand the performance of various campaigns and its characteristics such as targeting method, promotional offers etc. The campaign performance management module 306 also aids in identifying ideal product-channel mix for future campaigns, giving the breakup of channel effectiveness based on segmentation and various demographic factors like age, income, gender of the customer etc. The campaign performance management module 306 also provides inputs on campaign duration, campaign type, target region, targeting method and promotional offers. In addition, the campaign performance management module 306 also aids in monitoring campaign budgets and making various campaigns deliver the intended monetary value.

In yet another embodiment of the present invention, MDX may be employed at predicting attrition and tracking attrition 324 stages to generate attrition and loyalty analysis module 308. The attrition and loyalty analysis module 308 comprises attrition and loyalty reports 338 along with attrition score 372. MDX queries are used for generating the attrition and loyalty reports 338 from Jasper Reporting Tool 316. The attrition score 372 is an output of the statistical model outputs logit model 366 and RFM computation 348. The attrition score 372 facilitates predicting likelihood of attrition of the existing customer base. The attrition score 372 predicts the probability of attrition both at account level and customer level and a score is assigned to each customer based on his probability to attrite. The attrition score 372 also facilitates to identify attrition rates by product and demographics and identifies severity of attrition by customer segments and reasons for the same. In an exemplary embodiment of the present invention, the attrition score 372 is based on a metric i.e. values representing the number of customers who have closed their account or holdings with the enterprise.

The attrition and loyalty analysis module 308 having attrition and loyalty reports 338 and attrition score 372, aid in identifying loyal customers and predicting the customer base likely to attrite in near future. The attrition and loyalty analysis module 308 facilitates in analyzing parameters which constitute customer loyalty, which is an important factor in increasing overall profitability of an enterprise. Customer loyalty can be a function of various parameters such as customer's age on book, product holding, customer lifetime value (CLTV) and transaction behavior. In addition, attrition and loyalty analysis module 308 aids to identify loyal customers based on recency, frequency and monetary functions of their product usage. The attrition and loyalty analysis module 308 also aids to establish a relationship between a customer's LTV, profitability and attrition risk. The attrition and loyalty analysis module 308 also aids to ascertain if holding more products lead to better lifetime value (LTV) and thus a stronger loyal relationship between the customer and the enterprise.

The attrition and loyalty analysis module 308 facilitates to study attrition at a customer and account level. The customer level attrition reports analyzes the attrition at the customer level. The customer level attrition reports describe customers who have closed all their accounts or holdings with the enterprise. The analysis helps to evaluate customer attrition trend over time. The customer level attrition reports provide information related to the number and type of customers who have attrited, their demographic profiles etc. The account level reports provide information related to the account level attrition for each customer. This analysis helps to analyze the attrition trend reports over time, to analyze the product type that the customer has attrited from, the details of the account in terms of balance, usage, demographics, profitability and to evaluate the reasons for account attrition.

In an embodiment of the present invention, MDX's may be employed at product holding and cross-sell 328 and re-profiling and re-positioning 330 stage to generate cross-sell and product holding analysis module 310. The cross-sell and product holding analysis module 310 comprises cross-sell and product holding reports 340 and cross-sell recommendations 374. MDX queries are used for generating cross-sell and product holding reports 340 from Jasper Reporting Tool 316 Cross-sell product recommendations 374 is a statistical model which is generated employing the statistical model output cross-sell model output 350. The cross-sell model output 350 is derived using the statistical technique cluster analysis 360. Cross-sell model output 350 facilitates the enterprise in identifying next best products to be cross-sold. Cross-sell products 374 include profiling the customers based on an analysis of customers most likely to purchase certain kinds of product. In an exemplary embodiment of the present invention, the cross-sell product 374 is based one a metric i.e. a value which represents number and type of products held by the customer.

The cross-sell and product holding analysis module 310 having cross-sell and product holding reports 340 along with cross-sell scores 374 facilitates to identify preference of customers for certain category of product pertaining to an enterprise. Each profile of customer prefers to hold different type of products. These product holdings are based on customer demographics and their preference for certain category of product. The cross-sell and product holding analysis module 310 can enhance the understanding of customer's preferences for certain kinds of product. Product holding analysis also facilitates to enhance product features and align it with the changing needs of customers over a period of time. Further, the cross-sell and product holding analysis module 310 facilitates to provide inputs for loyalty and attrition and facilitates to understand the preference of certain product for each segment, thus, enabling a better cross-sell program. Further, the cross-sell and product holding analysis module 310 facilitates to provide analysis related to migration across customer age, income, profitability and liability. In addition, the cross-sell and product holding analysis module 310 facilitates to track dynamic attributes such as customer demographics and their monetary relationship with the enterprise.

In another embodiment of the present invention, MDX may be employed at profitability and survival analysis 326 stage to generate customer profitability and lifetime value analysis module 312. Customer profitability and lifetime value analysis module 312 comprises customer profitability and lifetime value reports 342 and customer lifetime value output 376. MDX queries are used for generating customer profitability and lifetime value analysis reports 342 from Jasper Reporting Tool 316. The customer and lifetime value (CLV) output 376 is a statistical model which is an output of the statistical model customer lifetime value (CLV) model output 352. The CLV model output 352 is generated using statistical techniques such as cluster analysis 360, forecasting 362 and survival analysis 364. The CLV model output 352 describes profitability, customer life time value and survivability analysis. In an exemplary embodiment of the present invention, survivability score may be associated with the CLV output 376. Survivability score is the likelihood of a customer to be on the book of accounts of the enterprise over a specific period of time. The specific time period may include remainder of lifetime that the customer is likely to spend with the enterprise from a given observation point. In another exemplary embodiment of the present invention, profitability score may be associated with the CLV output 376. Profitability score provides historical trend of customer profitability.

In an exemplary embodiment of the present invention, the CLV output 376 is based on one or more metrics. One metric may include a value which represents net revenue that is computed as gross revenue from the customer minus costs incurred to service the customer. Another metric may include discounted value of future profits yielded by the customer.

The customer profitability and lifetime value analysis module 312 having customer profitability and lifetime value reports 342 and CLV output 376 aid in analyzing profitability, by providing gross revenue generated by a customer for a specific account and the cost incurred by the enterprise for that account. The profitability analysis may also provide analysis related to different components of costs such as acquisition, servicing, retention, and balance and fee based revenue. The customer profitability and lifetime value analysis module 312 provides an analysis of the customer demographics of those who generate high revenue to evaluate customer segments by products that generated high revenue. Further, the customer profitability and lifetime value analysis module 312 also facilitates analyzing how profitability varies with product holding such as asset, liability and investment.

The customer profitability and lifetime value analysis module 312 also facilitates to analyze customer lifetime value which is the discounted value of future profits yielded by a customer. Customer lifetime value expresses profit-making potential of a customer within a given customer segment for specific lifetime periods of a customer relationship. The customer profitability and lifetime value analysis module 312 facilitates to analyze better screen and target customers, focusing on segments or individual customers who are likely to generate profit through usage of certain products. Further, the customer profitability and lifetime value analysis module 312 facilitates to identify customers who do not create value as an input to pricing based on the full economics of the customer usage that would aid in bundling or unbundling products and services. Furthermore, the customer profitability and lifetime value analysis module 312 facilitates to estimate worthiness of prospective customers that would aid to plan retention strategies and improve ability to identify which products to be offered such that they are profitable with a customer.

In another embodiment of the present invention, MDX may be employed at service request analysis and service level agreement analysis 332 stage to generate service request analysis module 314. Service request reports and service level agreement reports 344 are generated from Jasper Reporting Tool 316 by using MDX queries for service request analysis module 314. In an exemplary embodiment of the present invention, service level agreement reports 344 is based on a metric such as a value representing turn around time of a service offered by the enterprise.

The service request analysis module 314 facilitates an enterprise to monitor satisfaction of its customers in terms of non-monetary interactions of the customers with the enterprise. The service request analysis module 314 facilitates to provide evolving customer's needs and satisfaction levels with existing services of the enterprise. For example, service request analysis module 314 facilitates to highlight kind of incidents being raised by the customers, the time take to resolve them and the geographical and the demographic spread of the customers raising the incidents. The service request analysis module 314 facilitates to monitor request types across products and regions, to identify dissatisfied customers who are profitable. Further, the service request analysis module 314 facilitates to analyze service competency of the enterprise in terms of service level agreement (SLA) and turn around time (TAT) management. Furthermore, the service request analysis module 314 facilitates to review processes which have high TAT, to track the service request channel, to take corrective action to reduce frequent service requests for valuable customers, to track call centre representatives officers performance and to monitor branch performance.

Figure 4:
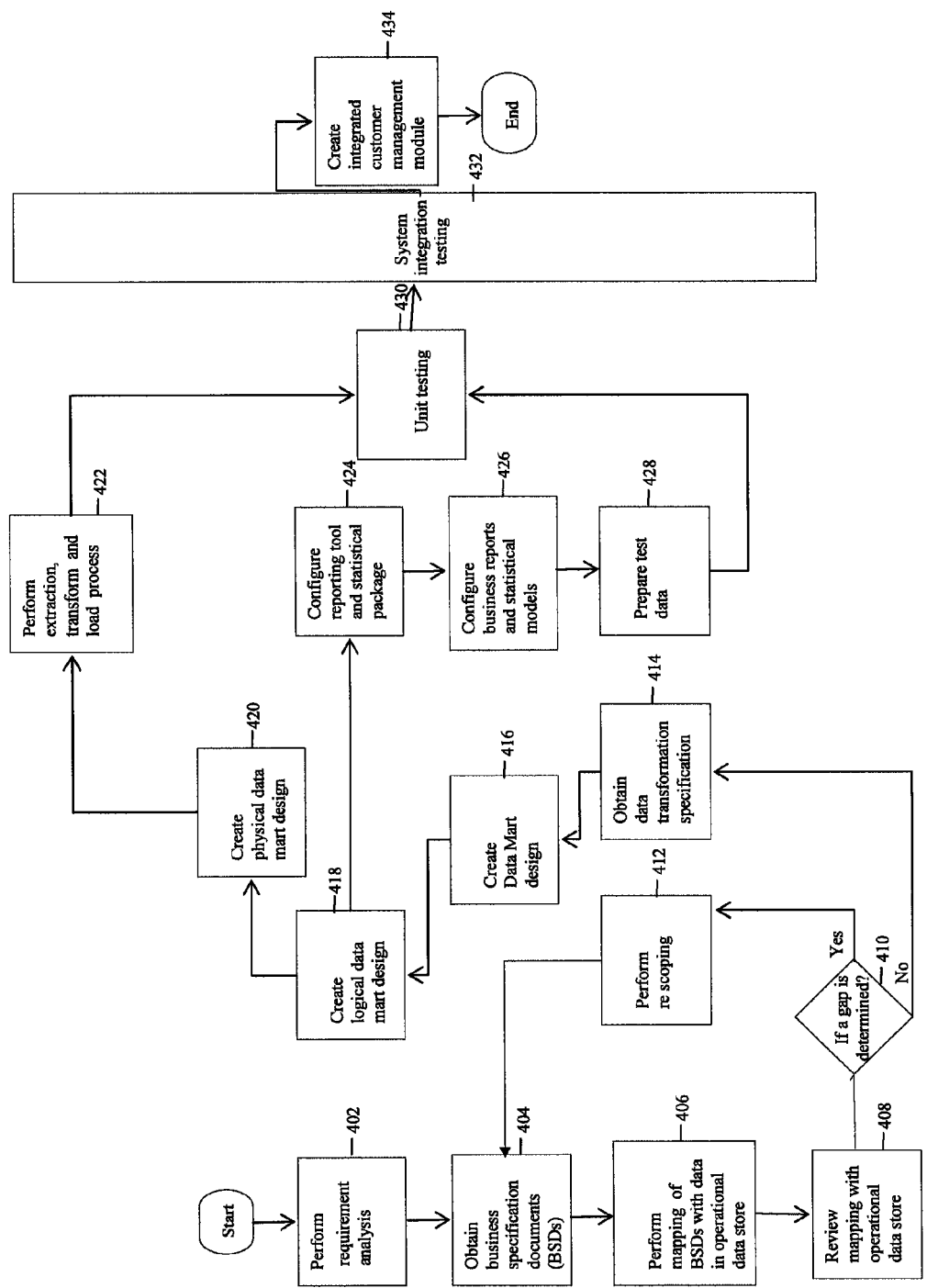
FIG. 4 is a flowchart illustrating a process for building various analytical modules of the integrated customer analytics solution, in accordance with an embodiment of the present invention.

FIG. 4 is a flowchart illustrating a process for designing one or more analytical modules of the integrated customer analytics solution, in accordance with an embodiment of the present invention. Each of the analytical modules comprises business reports and statistical models. Each of the statistical models are further associated with a predictive score. The predictive scores represent likelihood of customer behavior towards products, services and various other aspects in the enterprise.

At step 402, a requirement analysis is made for determining type of data which is to be used for generating the business reports and the statistical models. In an embodiment of the present invention, the requirement analysis step comprises retrieving data from multiple data sources in the enterprise. The data includes customer related data such as customer demographics, product holding data, account transaction data, campaign data etc. Further, the requirement analysis step comprises retrieving data from customers in the enterprise by interactions or seeking data through electronic mails or any other means. The retrieved data is analyzed for determining which data is to be used for developing the business reports and statistical models. The requirement analysis information may then be documented.

At step 404, business specification document is obtained. In an embodiment of the present invention, the business specification document facilitates to describe scope of the integrated customer analytics solution. The document comprises various fields related to customer data and is divided into various analytical modules. The data for each of the analytical modules is obtained from the multiple data sources and the various fields correspond to fields of the tables that include the customer related data in the data sources.

Further, the document describes customer relationship management (CRM) problems an enterprise may face at different stages of customer lifecycle. The document also provides data which may be required to address the problem areas. Such data are also used for developing the business reports and statistical models. For example, an enterprise may face an attrition problem. The attrition module in the business specification document may provide data which may be used to track customers which in turn would facilitate to track attrition. The business specification document may also provide a predictive attrition score which may be used to take preventive measures for minimizing attrition.

At step 406, mapping of business specification document with data stored in an operational data store is performed. In an embodiment of the present invention, the mapping is performed to check that data in the business specification document is aligned with the data in the operational data store. Mapping of data in the business specification document with data in the operational data store is performed to ascertain that all the fields described in the business specification document are present in the operational data store. Further, the mapping is performed to ascertain that the data can be accessible directly or with minor transformation. For example, the business specification document describes that customer age on the field 'books' need to be shown in months for creating reports and statistical models and the operational data store has customer's 'account open' date. The customer age on 'books' field in months is computed from the 'account open' field in the operational data store and stored.

At step 408, the mapping with operational data store is reviewed. In an embodiment of the present invention, it is reviewed whether the business specifications are mapped suitably with data stored in the operational data store.

At step 410, a check is performed to determine gap. In an embodiment of the present invention, gap analysis is performed to determine if any gap exists between business specifications document and data in the operational data store. Gap analysis is a tool that helps an enterprise to compare its actual performance with its potential or expected performance.

If it is determined that a gap exits between business specifications document and data in the ODS, then, at step 412, rescoping of business requirements is performed. In an embodiment of the present invention, rescoping facilitates determining the reason behind gap and fixing the gap For, example, if a gap is found, the gap may be filled by extracting missing data fields from multiple data sources of the enterprise to the operational data store. If the missing field does not exist in the multiple data sources, scope of the business specification document may be re-defined according to the available fields.

If it is determined that a gap does not exist between business specifications document and data in the operational data store, then, at step 414, data transformation specification is obtained. In an embodiment of the present invention, the data transformation specification comprises transformation techniques which are required during extract transform load (ETL) process. The data transformation specification comprises one or more predetermined formats which may be employed during the process of transformation of extracted data for loading into a data mart.

At step 416, data mart design is created. In various embodiments of the present invention, the data mart is designed for building the various analytical modules. The data mart design involves two stages i.e. logical data mart design and physical data mart design.

At step 418, logical data mart design is created. In an embodiment of the present invention, logical data mart design comprises designing structure of the data mart based on the business specification document and the requirement analysis document. The logical data mart design, thus, facilitates integrating data from the multiple data sources which may be disparate or redundant.

At step 420, a physical data mart design is created. In an embodiment of the present invention, physical data mart design includes creating physical databases or data warehouse for facilitating generation of specific business reports and statistical model outputs. Physical database design includes defining physical structures necessary to support the logical data mart design. Data gathered during the logical data mart design process may be used for defining the physical data structures. Defining physical structures may include naming standards, fields and various parameters associated with tables for setting up database environment in the data mart. Further, indexing and partition strategies may also be determined for setting up of the database environment.

At step 422, Extract Transform Load (ETL) processes are performed. In various embodiments of the present invention, data is extracted from the operational data store. The operational data store comprises data which is retrieved from multiple data sources. The multiple data sources may store data using different data structures or format. In an exemplary embodiment of the present invention, the data formats may include, but are not limited to, relational databases, flat files, non-relational database structures such as information management system (IMS), and other data structures such as virtual storage access method (VSAM), indexed sequential access method (ISAM). Further, data stored in the data sources may be obtained by fetching data from outside sources through web spidering or screen-scraping.

Extraction converts the data stored in the operational data store into a format which is suitable for the transformation process. In an embodiment of the present invention, the extraction process includes parsing of extracted data. Parsing facilitates to check if the data corresponds to a predetermined pattern or structure which is required for transformation of the data. If the data does not correspond to the predetermined pattern or structure, the data may be rejected entirely or in part.

The extracted data is, then, transformed based on the one or more predetermined formats that are described in the data transformation specification. The transformation of data is required to load the data into the data mart and conform to the operational needs of the data mart. For example, the operational needs of the data mart may include conforming to predetermined quality levels of the data mart. In an embodiment of the present invention, the transformation stage may include applying predetermined rules or functions to the extracted data to derive the data in terms of the one or more predetermined formats for loading into the data mart.

In an exemplary embodiment of the present invention, the predetermined rules or function may include, but are not limited to, selecting only certain columns to load (or selecting null columns which are not to be loaded), translating coded values (e.g., if the data source stores 1 for male and 2 for female, but the data mart stores M for male and F for female), encoding free-form values (e.g., mapping "Male" to "1" and "Mr" to M), deriving a new calculated value (e.g., sale_amount=qty*unit_price), filtering, sorting, joining data from multiple sources (e.g., lookup, merge), aggregation, generating surrogate-key values, transposing or pivoting, splitting a column into multiple columns (e.g., putting a comma-separated list specified as a string in one column as individual values in different columns), applying any form of simple or complex data validation, etc. In another embodiment of the present invention, the data stored in the data sources may require minor or no manipulation of data.

The transformed data is, then, loaded into the physical database of the data mart. In various embodiments of the present invention, different tables in the data mart may require different loading strategies. In an embodiment of the present invention, the process of loading may either replace existing data with cumulative or updated data at a predetermined interval of time. In another embodiment of the present invention, the process of loading may add new data to the existing data thus forming historical data. The data in the data mart, thus, reflects information related to customers across the multiple data sources which the enterprise may wish to track. The data mart further facilitates performing trend analysis of data related to customers based on the historical data.

At step 424, statistical package module and reporting tool are configured. In an embodiment of the present invention, statistical package module such as R-Project enables generating various statistical model outputs using the data stored in the data mart. In an embodiment of the present invention, reporting tool such as a Jasper Reporting Tool is configured. Jasper Reporting Tool is a front-end reporting tool for the customers, which facilitates generating the business reports using the data stored in the data mart and the statistical model outputs.

At step 426, business reports and statistical models are configured. In various embodiments of the present invention, business reports and statistical models are configured using a variety of techniques. One or more business reports and statistical model outputs are configured in one or more analytical modules as a part of the integrated customer analytics module 434. Analytical modules are built on the data mart. Conventional techniques may be used for configuring reports on Jasper Reporting Tool and suitable statistical techniques may be used for building statistical models using r-project.

At step 428, test data preparation is performed. In an embodiment of the present invention, test data which is required for conducting unit testing is prepared. Test data is prepared as a part of unit test in order to test scenarios and relationships between the one or more analytical modules in the integrated customer analytics solution 434.

At step 430, unit testing is performed. In an embodiment of the present invention, unit testing is performed to ascertain that all the business reports and statistical model outputs are generated from the data mart through the reporting tool and statistical package respectively. In an exemplary embodiment of the present invention, unit testing is performed to ascertain that all the business reports and statistical model outputs are generated from the data mart module through the Jasper Reporting Tool and R-Project respectively. In another embodiment of the present invention, unit testing is performed to ascertain that the ETL process functions properly.

At step 432, system integration testing is performed. In an embodiment of the present invention, system integration testing is performed which ascertains all the activities of data mapping, ETL and business report and statistical model output generation.

At step 434, integrated customer analytics solution is built. In an embodiment of the present invention, six analytical modules such as transaction behavior analysis module, campaign performance management module, attrition and loyalty analysis module, cross-sell and product holding analysis module, customer profitability and lifetime value analysis module and service request analysis module are created.

Figure 5:
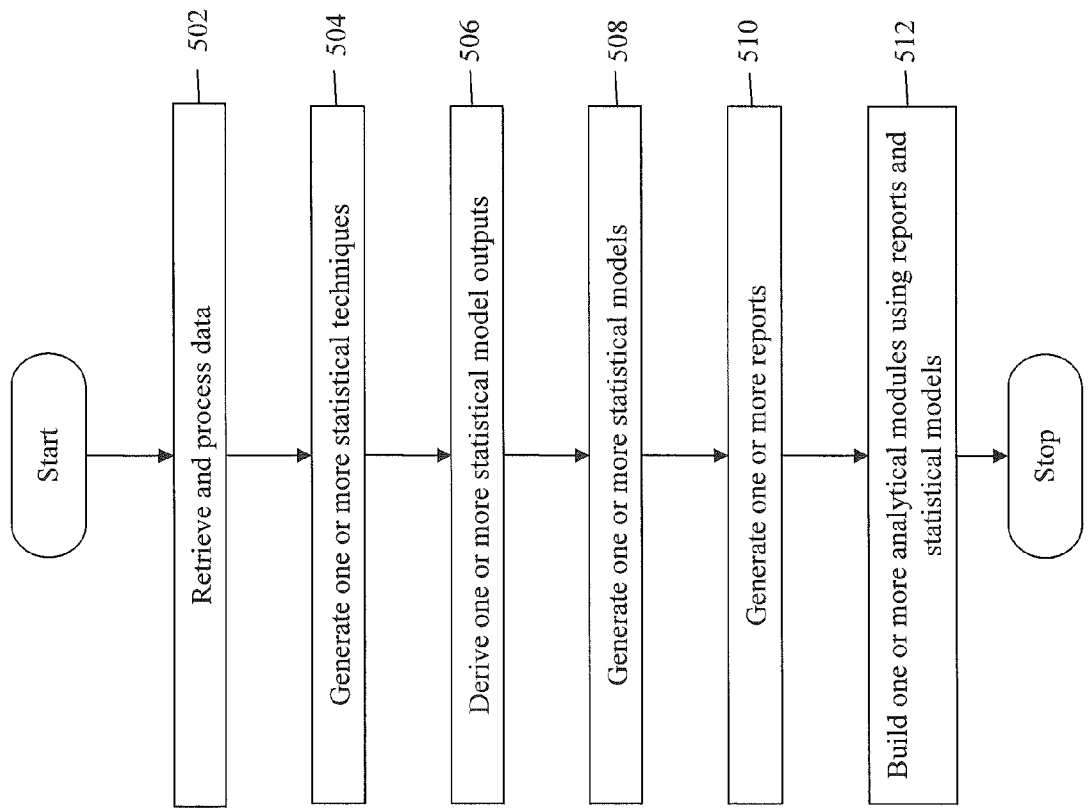
FIG. 5 is a flowchart illustrating a method for building one or more analytical modules of the integrated customer analytics solution, in accordance with an embodiment of the present invention.

FIG. 5 is a flowchart illustrating a method for building one or more analytical modules of the integrated customer analytics solution, in accordance with an embodiment of the present invention.

At step 502, data from one or more data sources is retrieved and processed. In various embodiments of the present invention, retrieving and processing the data from the one or more data sources comprises gathering the data from the one or more data sources. At least two data sources may be disparate data sources which are unable to communicate. Further, the data is stored in the form of data structures in the operational data store. The stored data is extracted. Extraction comprises determining if the data structure corresponds to a predetermined data structure. The extracted data is, then, transformed based on one or more predetermined formats. The transformed data is finally loaded into the data mart.

At step 504, one or more statistical techniques are generated using the processed data. In an embodiment of the present invention, the one or more statistical techniques may include, but are not limited to, descriptive statistics, cluster analysis, forecasting, survival analysis and logit model. One or more codes are developed using a statistical package module and using the one or more codes the processed data stored in the data mart is manipulated to obtain the one or more statistical techniques. The statistical techniques facilitate to analyze one or more attributes related to the customer. The one or more attributes related to the customer may include, but are not limited to, transaction related information, campaign related information, attrition and loyalty related information, customer life time value and survivability related information, profitability related information with respect to products, and customer satisfaction related information with respect to services offered by the enterprise.

At step 506, one or more statistical model outputs are derived from the one or more statistical techniques. In an embodiment of the present invention, one or more statistical model outputs may include, but are not limited to, recency frequency monetary computation, cross-sell model output, customer lifetime value (CLV) model output, campaign response model output, and attrition model output. The one or more statistical model outputs represent one or more metrics corresponding to the analyzed attributes. The one or more metrics may include, but are not limited to, recency, frequency and monetary value of transactions made by the customer, value representing one or more campaign management and performance related details, value representing attrition, customer lifetime value, value representing product related details, and value representing service related details offered by the enterprise.

At step 508, one or more statistical models may be generated using the one or more statistical model outputs. In an embodiment of the present invention, each of the statistical models is associated with one or more scores. The scores include predictive scoring algorithm that facilitates to predict likelihood of customer behavior towards products, services and other customer related aspects associated with the enterprise. The scores include, but are not limited to, recency frequency and monetary score, campaign response score, attrition score, cross-sell products, customer lifetime value, and service level agreement score.

At step 508, one or more reports are generated based on the processed data and the one or more statistical model outputs. In an embodiment of the present invention, reports may be generated by writing queries to the data mart employing a reporting module. Further, the one or more reports are obtained based on processed data stored in a data mart and/or the one or more metrics stored in the data mart which correspond to the analyzed attributes. In an exemplary embodiment of the present invention, the queries may be written using query languages such as multidimensional expressions and standard query language.

At step 510, one or more analytical models are built using the one or more reports and the one or more statistical model outputs. In an exemplary embodiment of the present invention, the one or more analytical modules may include, but are not limited to, transaction behavior analysis module, campaign performance and management module, attrition and loyalty analysis module, cross-sell and product holding analysis module, customer profitability and lifetime value analysis module and service request analysis module. In an embodiment of the present invention, queries may be written into the data mart at one or more stages to build the one or more analytical modules. The one or more stages may include transaction behavior and channel preference stage to build transaction behavior analysis module, lead generation and campaign management and performance stage to build campaign performance and management module, predicting attrition and tracking attrition stage to build attrition and loyalty analysis module, profitability and survival analysis stage to build customer profitability and lifetime value analysis module, product holding and cross-sell product and re-profiling and re-positioning stage to build cross-sell and product holding analysis module, service request analysis and service level agreement analysis to build the service request analysis module.

The present invention may be implemented in numerous ways including as a apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for building an integrated customer analytics solution for an enterprise comprising one or more data sources in a client-server architecture over a network, the client-server architecture comprising one or more user devices and one or more servers for processing requests received from the one or more user devices, the method comprising:

retrieving and processing customer data from the one or more data sources, wherein retrieving and processing the customer data comprises:
  gathering the customer data from the one or more data sources, wherein at least two data sources are disparate data sources which store data using different formats;
  storing the gathered customer data in the form of data structures comprising one or more data fields in an operational data store;
  extracting the customer data from the operational data store if the data structure corresponds to a predetermined data structure;
  transforming the extracted customer data based on one or more predetermined formats;
  transforming the existing one or more data fields of the operational data store into a first set of new data fields based on business specifications and requirement analysis of the enterprise;
  loading the transformed customer data and the first set of new data fields into a data mart; and
  updating the data mart with a second set of new data fields and new customer data corresponding to the second set of new data fields over a period of time of predetermined customer lifecycle stages, wherein the updating of the data mart is based on the business specifications and requirement analysis of the enterprise;

analyzing the processed customer data stored in the data mart using one or more codes to generate one or more statistical techniques, the statistical techniques being at least one of descriptive statistics, cluster analysis, forecasting, survival analysis and logit model, wherein the one or more codes are developed using a statistical package module, and further wherein the generated one or more statistical techniques facilitate analyzing one or more predetermined attributes related to the customer;

deriving, by a processor, one or more statistical model outputs using the one or more generated statistical techniques, wherein the statistical model outputs represent one or more metrics corresponding to the analyzed attributes;

generating one or more statistical models corresponding to the one or more statistical model outputs, the one or more statistical models being associated with one or more scores which are computed based on the statistical model outputs, wherein the one or more scores facilitate to predict likelihood of customer behavior towards products, services and other customer related aspects associated with the enterprise;

generating one or more reports based on at least one of: the processed customer data and the one or more statistical model outputs; and building one or more analytical modules for the predetermined customer lifecycle stages comprising the one or more reports and the one or more statistical models, wherein the one or more analytical modules constitute the integrated customer analytics solution.

2. The method of claim 1, wherein the one or more predetermined attributes related to the customer comprises: transaction related information, campaign related information, attrition and loyalty related information, customer life time value and survivability related information, profitability related information with respect to products, and customer satisfaction related information with respect to services offered by the enterprise.

3. The method of claim 1, wherein the one or more statistical model outputs comprises: recency frequency monetary computation, cross-sell model output, customer lifetime value (CLV) model output, campaign response model output, and attrition model output.

4. The method of claim 3, wherein the one or more metrics comprises: recency, frequency and monetary value of transactions made by the customer, value representing one or more campaign management and performance related details, value representing attrition, customer lifetime value, value representing product related details, and value representing service related details offered by the enterprise.

5. The method of claim 4, wherein the one or more scores comprise recency frequency and monetary score, campaign response score, attrition score, cross-sell products, customer lifetime value, service level agreement score.

6. The method of claim 1, wherein generating the one or more reports based on the processed customer data and the one or more statistical model outputs comprises:

writing queries to the data mart employing a reporting module; and obtaining the one or more reports based on processed customer data stored in the data mart and the one or more metrics stored in the data mart.

7. The method of claim 6, wherein queries are written using at least one of the query languages: multidimensional expressions and standard query language.

8. The method of claim 1, wherein the one or more analytical modules comprises: transaction behavior analysis module, campaign performance and management module, attrition and loyalty analysis module, cross-sell and product holding analysis module, customer profitability and lifetime value analysis module and service request analysis module.

9. The method of claim 1, wherein queries are written to the data mart at the predetermined stages of the customer life cycle to build the one or more analytical modules comprising the one or more reports and the one or more statistical models.

10. The method of claim 9, wherein the predetermined customer lifecycle stages comprises: transaction behavior and channel preference stage to build transaction behavior analysis module, lead generation and campaign management and performance stage to build campaign performance and management module, predicting attrition and tracking attrition stage to build attrition and loyalty analysis module, profitability and survival analysis stage to build customer profitability and lifetime value analysis module, product holding and cross-sell product and re-profiling and re-positioning stage to build cross-sell and product holding analysis module, service request analysis and service level agreement analysis to build the service request analysis module.

11. A system for building an integrated customer analytics solution for an enterprise comprising one or more data sources in a client-server architecture, wherein the system comprises one or more user devices and one or more servers for processing requests received from the one or more user devices, the system comprising:

a data management module configured to:

extract customer data from an operational data store, the operational data store storing the customer data in the form of data structures comprising one or more data fields gathered from the one or more data sources, wherein at least two data sources are disparate data sources which store data using different formats, and further wherein the extraction is performed to ascertain that the data structure corresponds to a predetermined data structure;

transform the extracted customer data based on one or more predetermined formats;

transform the existing one or more data fields of the operational data store into a first set of new data fields based on business specifications and requirement analysis of the enterprise;

load the transformed customer data and the first set of new data fields into a data mart; and update the data mart with a second set of new data fields and new customer data corresponding to the second set of new data fields over a period of time of predetermined customer lifecycle stages, wherein the updating of the data mart is based on the business specifications and the requirement analysis of the enterprise;

a statistical package module configured to:

analyze the processed customer data stored in the data mart using one or more codes to generate one or more statistical techniques, the statistical techniques being at least one of descriptive statistics, cluster analysis, forecasting, survival analysis and logit model, wherein the one or more codes are developed using the statistical package module, and further wherein the generated one or more statistical techniques facilitate analyzing one or more predetermined attributes related to the customer;

derive one or more statistical model outputs using the one or more generated statistical techniques, wherein the statistical model outputs represent one or more metrics corresponding to the analyzed attributes;

generate one or more statistical models corresponding to the one or more statistical model outputs, the one or more statistical models being associated with one or more scores which are computed based on the statistical model outputs, wherein the one or more scores facilitate to predict likelihood of customer behavior towards products, services and other customer related aspects associated with the enterprise; and a reporting module configured to generate one or more reports based on the processed customer data stored in the data mart and the statistical model outputs, wherein one or more analytical modules are built for the predetermined customer lifecycle stages using the one or more reports and the one or more statistical models resulting in the integrated customer analytics solution.

12. The system of claim 11, wherein the reporting module comprises a Jasper Reporting Tool.

13. The system of claim 11, wherein the statistical package module comprises R-project.

14. The system of claim 11, wherein the data mart is a multidimensional database or a relational database.

* * * * *